United States Patent
Higashi et al.

(10) Patent No.: US 7,130,097 B2
(45) Date of Patent: Oct. 31, 2006

(54) IMAGE FORMING APPARATUS

(75) Inventors: Yumiko Higashi, Kokubunji (JP); Kenji Izumiya, Hachioji (JP); Eiji Nishikawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 11/235,162

(22) Filed: Sep. 27, 2005

(65) Prior Publication Data

US 2006/0158712 A1    Jul. 20, 2006

(30) Foreign Application Priority Data

Jan. 18, 2005    (JP) ............... 2005-010492

(51) Int. Cl.
*G02B 26/08*    (2006.01)
(52) U.S. Cl. ............................................. 359/216
(58) Field of Classification Search ........ 359/216–218; 347/261
See application file for complete search history.

(56) References Cited

U.S. PATENT DOCUMENTS 6,724,410 B1 *   4/2004   Arai ........................... 347/115

FOREIGN PATENT DOCUMENTS

JP    2003-262991    9/2003

* cited by examiner

*Primary Examiner*—Euncha P. Cherry
(74) *Attorney, Agent, or Firm*—Finnegan, Henderson, Farabow, Garrett & Dunner, L.L.P.

(57) ABSTRACT

There is provided a controller that controls and drives the polygon mirror to a target speed with keeping a predetermined phase. When the controller controls the speed of the polygon mirror along with the image magnification adjustment, the controller controls the polygon mirror with a waiting time t1 from an end of the speed control of the polygon mirror for stabilizing before the phase control and a waiting time t2 from an end of the phase control of the polygon mirror for stabilizing, the t1 and t2 being set with a relation of t1<t2.

14 Claims, 6 Drawing Sheets

AFTER FIXATION

IMAGE FORMING APPARATUS

RELATED APPLICATION

This application is based on patent application No. 2005-10492 filed in Japan, the entire content of which is hereby incorporated by reference.

BACKGROUND

1. Field of the Invention

The present invention relates to an image forming apparatus such as copying machine and printer, particularly to an image forming apparatus that is provided with a function of writing image on a recording medium such as photosensitive material by scanning a laser beam from a light source using a polygon mirror.

2. Description of the Related Art

In an electro-photographic image forming apparatus such as laser printer, image is formed through the processes including charging, exposure, development, transfer, and fixation.

To be concrete, by irradiating a modulated light beam (laser beam) according to an image data, a static latent image of the image to be formed is formed on the surface of the charged photosensitive drum. And this latent image is developed into a toner image by a developing unit. This toner image is transferred onto a transfer material (recording paper) by a transfer roller. And the toner image on the transfer material is then fixed by fixing heat in a fixing unit. Thus, the image is formed on the transfer material.

In fixing the toner image on a transfer material, moisture in the transfer material is absorbed by the fixing heat and consequently the transfer material shrinks. Particularly in case of forming an image on both sides, the image size on the top surface becomes different from that on the back surface due to the shrinkage of the transfer material in fixing the top surface image, and there arises a problem that the top and back surface images become out of register (out of top/back register).

This can be coped with by controlling the frequency of pixel clock as well as controlling the speed of polygon mirror.

In controlling the speed of the polygon mirror in a color image forming apparatus, the phase of the polygon mirror is also controlled to adjust the color register after the speed control of the polygon mirror. That is to say, in case a color image is formed by using multiple polygon mirrors for each color, it is necessary to match the phase of the polygon mirrors with each other to eliminate color difference.

A prior art relating to this speed control and phase control of the polygon mirror is, for example, one in the Japanese Patent Application No. 2003-262991.

DISCLOSURE OF THE INVENTION

[Problems to be Solved by the Invention]

As explained above, in case the speed and phase of the polygon mirror are controlled, a clock generating unit to generate a polygon mirror driving clock employs a PLL (phase locked loop) circuit so as to attain an accurate and stable clock.

In the PLL circuit in the clock generating unit, it is assumed that the polygon mirror reaches its stable rotation when a predetermined time (preset value) has elapsed after an end of the speed control and phase control. The above predetermined time (preset value) has been determined for each integrated circuit or the like constituting the PLL circuit by its manufacturer. The preset value for an image forming apparatus is determined based on the quality of the image to be formed by using the polygon mirror. Any conventional image forming apparatus is so constructed that a waiting time of this preset value is needed for stabilizing both in the speed control and in the phase control.

Through extensive study by the inventor of the present invention, however, it is found out that the predetermine time (preset value) for stabilizing the polygon mirror results in waste of time, thereby resulting in low productivity, when the speed and phase are controlled in series as explained above.

An object of the present invention is to enable to obtain an image with sufficient quality and improve the productivity in forming an image on an image forming apparatus that employs the speed control of the polygon mirror. To realize this, the present invention offers an image forming apparatus that can control both speed and phase of the polygon mirror with a predetermined optimum waiting time for stabilizing when the speed of the polygon mirror is controlled for example in adjusting the image magnification.

SUMMARY

The present invention provides the following apparatus:

An image forming apparatus that includes a polygon mirror for scanning a light beam; a clock generating unit to generate a polygon mirror driving clock by using a PLL control; a polygon mirror driving unit to drive the polygon mirror in accordance with the polygon mirror driving clock; and a controller to instruct to the clock generating unit for a speed control and a phase control of the polygon mirror and to control the polygon mirror to a target speed with keeping a predetermined phase; wherein when the controller controls the speed of the polygon mirror, the controller controls the polygon mirror with a waiting time t1 from an end of the speed control of the polygon mirror for stabilizing before the phase control and a waiting time t2 from an end of the phase control of the polygon mirror for stabilizing, the t1 and t2 being set with a relation of t1<t2.

The present invention also provides the following apparatus:

An image forming apparatus provided with a function of forming an image on both sides of a recording paper that includes a polygon mirror for scanning a light beam; a clock generating unit to generate a polygon mirror driving clock by using a PLL control; a polygon mirror driving unit to drive the polygon mirror in accordance with the polygon mirror driving clock; and a controller to instruct to the clock generating unit for a speed control and a phase control of the polygon mirror and to control the polygon mirror to a target speed with keeping a predetermined phase; wherein when the controller controls the speed of the polygon mirror upon switching from the light beam scanning for image formation on one side to the light beam scanning for image formation on the other side, the controller controls the polygon mirror with a waiting time t1 from an end of the speed control of the polygon mirror for stabilizing before the phase control and a waiting time t2 from an end of the phase control of the polygon mirror for stabilizing, the t1 and t2 being set with a relation of t1<t2.

The invention itself, together with further objects and attendant advantages, will best be understood by reference to the following detailed description taken in conjunction with the accompanying drawings.

BRIEF DESCRIPTION OF THE DRAWINGS

FIG. 3($a$) and FIG. 3($b$) each is an explanatory figure showing the shrinkage of a recording paper in an embodiment of the present invention.

In the following description, like parts are designated by like reference numbers throughout the several drawing.

DESCRIPTION OF THE PREFERRED EMBODIMENT

The preferred embodiment of the present invention is described hereunder by reference to the accompanying drawings.

The image forming apparatus to which the present invention applies is an image forming apparatus provided with a function of forming a color image on both sides of a recording paper and also with a function of generating a polygon mirror driving clock for each color by using a PLL control.

To begin with, the mechanical construction of an apparatus such as a copying machine to which the image forming apparatus 100 of this embodiment applies is described hereunder.

Figure 2:
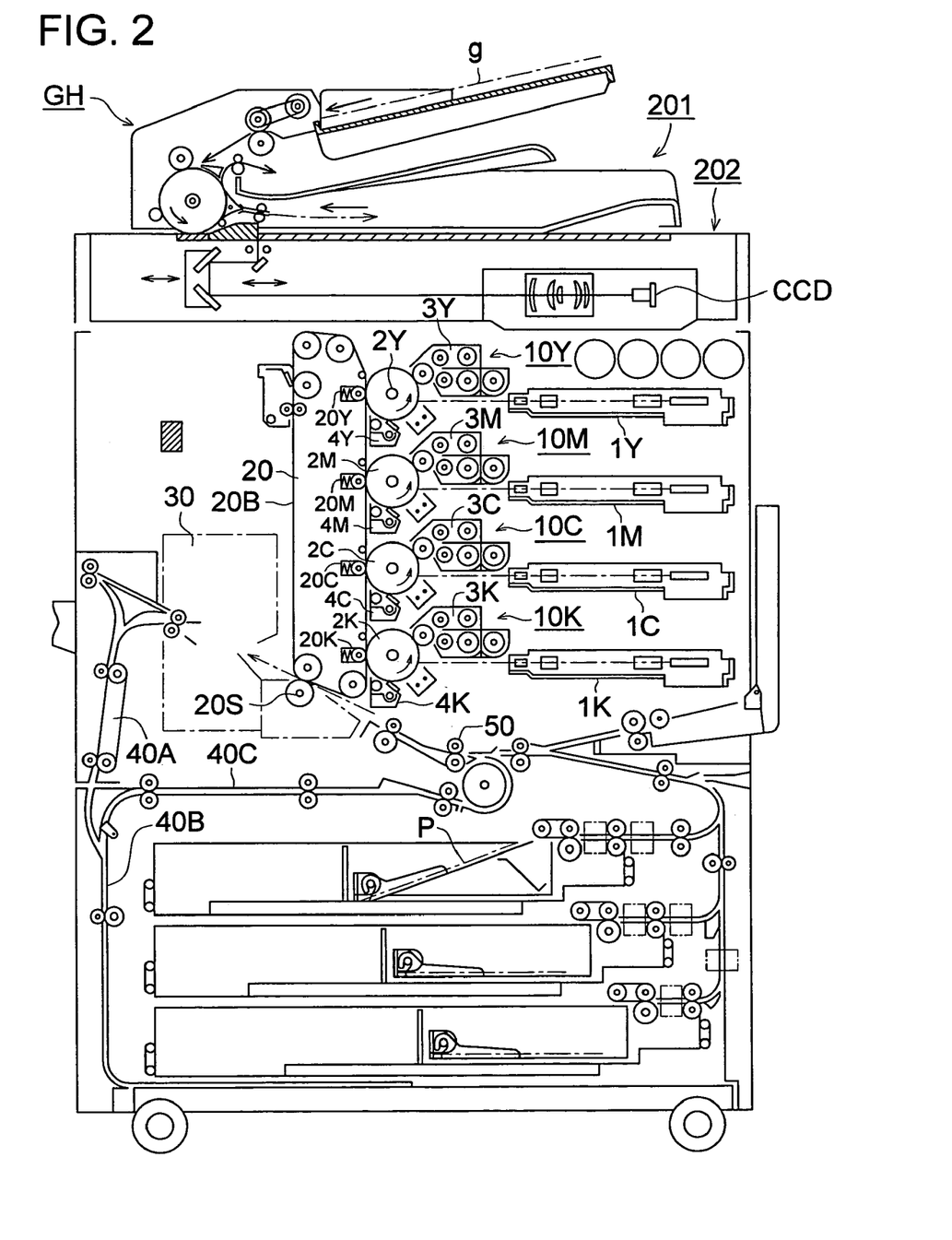
FIG. 2 is a cross-sectional view showing the mechanical construction of the image forming apparatus according to an embodiment of the present invention.

FIG. 2 is a cross-sectional view of an image forming apparatus GH (image forming apparatus 100) such as a color copying machine to which this embodiment applies. As shown in FIG. 2, the image forming apparatus GH has multiple image forming sections 10Y, 10M, 10C, 10K corresponding to each color (Y, M, C, K herein), transfer section 20 for image transfer, fixing unit 30 as a fixing device, paper conveying section 40 (40A, 40B, 40C) including a paper re-supply mechanism for image formation on both sides.

The image forming section 10Y for forming an image of Y (yellow) color has an exposing unit 1Y, photosensitive drum 2Y as a Y-color image carrier, developing unit 3Y, and an image forming material cleaning device 4Y. The exposing unit 1Y scans a light beam (laser beam) onto the photosensitive drum 2Y using a polygon mirror (not shown) in accordance with the later-mentioned control to which the present embodiment has applied. On the surface of the photosensitive drum 2Y, a static latent image is formed by the laser light emitted from the exposing unit 1Y. The developing unit 3Y develops the static latent image formed on the photosensitive drum 2Y by using Y-color toner. The image forming material cleaning device 4Y cleans residual toner remained on the circumferential surface of the photosensitive drum 2Y.

The image forming section 10M for forming an image of M (magenta) color has an exposing unit 1M, photosensitive drum 2M as a M-color image carrier, developing unit 3M, and an image forming material cleaning device 4M. The image forming section 10C for forming an image of C (cyan) color comprises an exposing unit 1C, photosensitive drum 2C as a C-color image carrier, developing unit 3C, and an image forming material cleaning device 4C. The image forming section 10K for forming an image of K (black) color comprises an exposing unit 1K, photosensitive drum 2K as a K-color image carrier, developing unit 3K, and an image forming material cleaning device 4K. These image forming sections 10M, 10C, 10K forms an image of each color in the same processes as in the image forming section 10Y.

The transfer section 20 rotates an intermediate transfer belt 20B and transfers each image formed by the image forming section 10 onto the rotating intermediate transfer belt 20B by means of the primary transfer roller 20Y, 20M, 20C, 20K (primary transfer) to form a composite color image (color toner image). When a recording paper P is conveyed onto a secondary transfer roller 20S, the transfer section 20 transfers the color toner image formed on the intermediate transfer belt 20B onto one side (top surface) of the recording paper P all at once (secondary transfer).

The fixing unit 30 applies a heat fixing treatment to the recording paper P on the top surface of which a color toner image has transferred, while conveying it between a heat roller and a pressure roller, and fixes the color toner image in a stable state on the recording paper.

The paper conveying section 40 has a circulating path 40A, reversing path 40B, and double-sided paper conveying section 40C. In forming an image on the back surface, when the recording paper P fed out from the fixing unit 30 passes through the circulating path 40A and reaches the reversing path 40B, the direction of the rotating roller of the reversing path 40B is reverted so as to convey the recording paper P to the double-sided paper conveying section 40C. As the recording paper P passes through the double-sided paper conveying section 40C, the surface fixed with an image (top surface) faces upward. After passing through the double-sided paper conveying section 40C, the recording paper P is reversed top side back by the paper feed roller 50 and transferred again to the secondary transfer roller 20S, where a color image is transferred on the other side (back surface) of the recording paper P all at once.

Figure 1:
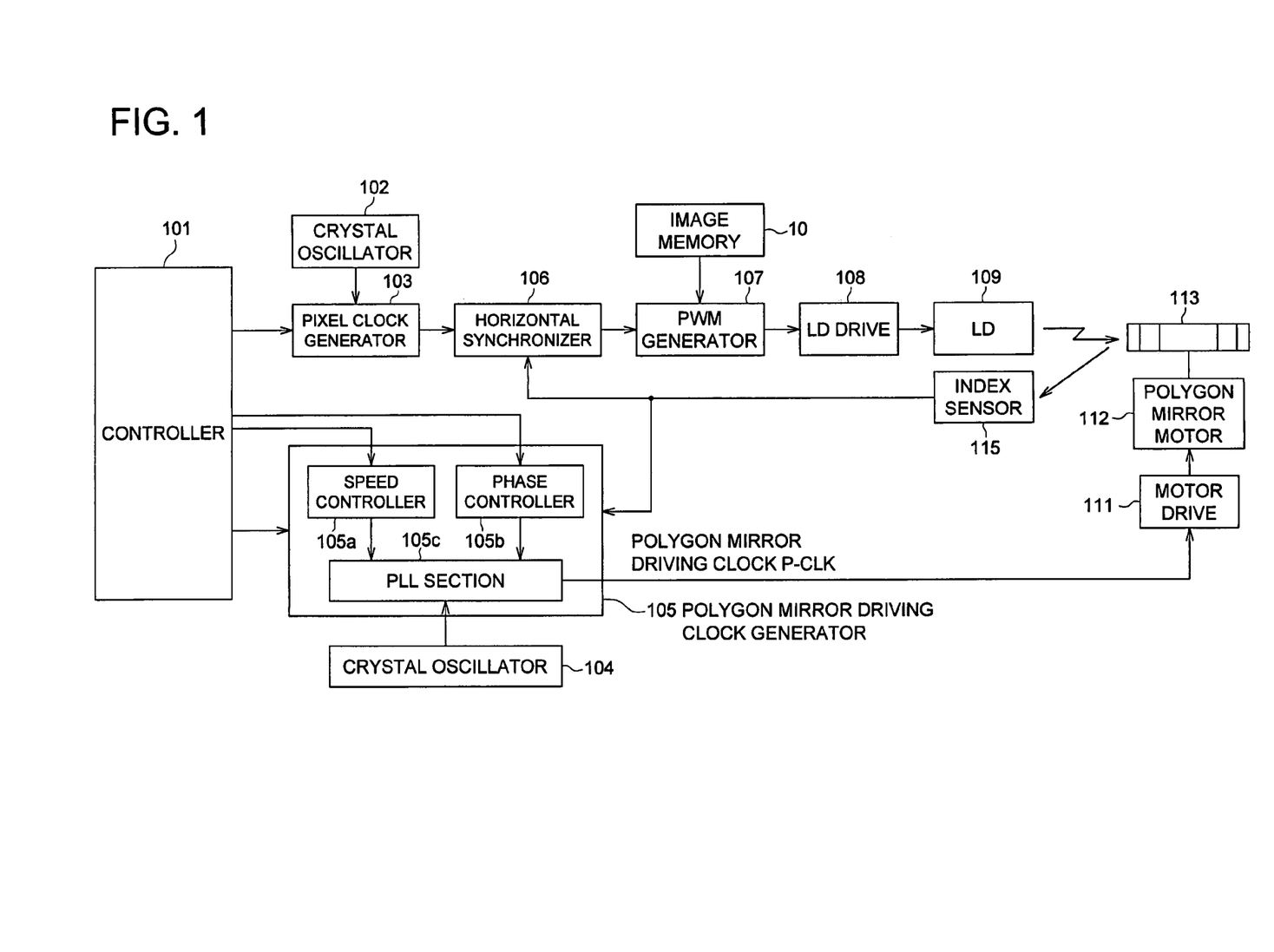
FIG. 1 is a block diagram showing the electrical composition of the image forming apparatus according to an embodiment of the present invention.

The electrical composition of the first embodiment of the image forming apparatus 100 is described hereunder, using FIG. 1.

The following description of this embodiment refers mostly to the compositional requirements of the exposing unit which, when the polygon mirror driving clock for each color is generated by using the PLL control so as to form a color image on both sides of a recording paper, are needed for the operations of the speed control of the polygon mirror for each color along with the image magnification adjustment upon switching from the image formation on one side to the image formation on the other side. Accordingly, such compositional requirements that are generous for an image forming apparatus and well-known are omitted.

In order to simplify the description, a control system of the exposing unit 1 is taken for example in FIG. 1, but the description also applies to the control system of the exposing units 1Y, 1M, 1C, 1K for each color.

As shown in FIG. 1, the exposing unit 1 of the image forming apparatus 100 of this embodiment includes a controller 101, crystal oscillator 102, pixel clock generating circuit 103, crystal oscillator 104, polygon mirror driving clock generator 105, horizontal synchronizer 106, PWM (pulse width modulation) generator 107, LD drive 108, index sensor 115, LD (laser diode) 109, motor drive 111, polygon mirror motor 112, and polygon mirror 113.

The controller 101 performs various controls for image formation according to the control programs for the image forming apparatus stored in a data memory (not shown).

To be concrete, in case of forming an image on the back surface, the controller 101 performs various controls for the magnification adjustment in the paper feed direction based on the degree of shrinkage (shrinkage factor) of the recording paper P caused in the fixing process for forming an image on both sides.

To be more concrete, the controller 101 changes the frequency of the polygon mirror driving clock (hereinafter called the polygon mirror driving clock frequency) for the back surface image formation so as to adjust the magnification in the paper feed direction for the back surface image formation based on the degree of shrinkage (shrinkage factor) of the recording paper P caused in the fixing process for forming an image on both sides. In this control, the controller 101 changes the polygon mirror driving clock frequency for each color separately but the ratio of change in the polygon mirror driving clock frequency for each color is the same. Then, the controller 101 outputs a control signal to instruct the polygon mirror driving clock generator to generate a polygon mirror driving clock signal having the changed polygon mirror driving clock frequency.

If the polygon mirror driving clock frequency becomes higher as a result of the change in the polygon mirror driving clock frequency, the speed of the polygon mirror 113 increases and so the speed of main scanning (main scanning speed) of the laser light on the photosensitive drum by using the polygon mirror 113 increases. That is to say, when the process speed is constant, the image to be formed shrinks as the main scanning speed increases, and the image to be formed enlarges as the main scanning speed decreases.

Since the magnification in the main scanning direction also changes when the main scanning speed is changed by changing the above polygon mirror driving clock frequency, the control section 101 also changes the frequency of the pixel clock signal (hereinafter called the pixel clock frequency) for the back surface image formation so as to adjust the magnification in the main scanning direction. Since shrinkage of the transfer material (recording paper) resulting from the fixation is caused also in the main scanning direction, the controller 101 changes the pixel clock frequency including the magnification adjustment in the main scanning direction to adjust the shrinkage of the transfer material in the main scanning direction. In this control, the controller 101 changes the pixel clock frequency for each color separately but the ratio of change in the pixel clock frequency for each color is the same. Then, the controller 101 outputs a control signal to instruct the pixel clock generating circuit 103 to generate a pixel clock signal having the changed pixel clock frequency.

For example, assuming that the recording paper P before fixation has a length (paper feed direction) of L mm and width (main scanning direction) of W mm as shown in FIG. 3(a), and that the length shrinks to L' mm and width to W' mm after the fixation on the top surface of the recording paper P as shown in FIG. 3(b), and given that the polygon mirror driving clock frequency for the top surface image formation is F0 and the polygon mirror driving clock for the back surface image formation is F, an equation $F=(L/L')F0$ applies. Also, given that the pixel clock frequency for the top surface image formation is f0 and the pixel clock frequency for the back surface image formation is f, an equation $f=(L/L')\cdot(W/W')f0$ applies.

The controller 101 changes the polygon mirror driving clock frequency for each color separately but the ratio of change (L/L') in the polygon mirror driving clock frequency for each color is the same. Similarly to this, the controller 101 changes the pixel clock frequency for each color separately but the ratio of change $(L/L')\cdot(W/W')$ in the pixel clock frequency for each color is the same.

The controller 101 also changes a color difference adjusting value, equivalent to an adjusting value for the gap between processes, in accordance with the change in the polygon mirror driving clock frequency so as to adjust the timing of image formation of each color. This is because the magnification adjustment in the paper feed direction (sub scanning direction) without changing the process speed causes a change in the number of lines which is equivalent to the gap between processes. The gap between processes is stored in a memory (not shown) in the form of a color difference adjusting value.

This color difference adjusting value is determined for the image formation on the top surface. When the magnification is adjusted in the sub scanning direction to form an image on the back surface, color difference is caused if this color difference adjusting value is not changed to accord to the shrinkage factor (ratio of change) in the sub scanning direction. Accordingly, a different color difference adjusting value is made applicable to the top surface image formation and to the back surface image formation.

When the controller 101 controls the speed of the polygon mirror 113 along with the image magnification adjustment, it also controls the phase after the speed control. In this operation, the controller 101 controls the polygon mirror 113 with a waiting time t1 from an end of the speed control for stabilizing and a waiting time t2 from an end of the phase control of the polygon mirror for stabilizing. Given that the preset value predetermined for stabilizing after an end of the speed control of the polygon mirror 113 is t0, the time t1 and t2 used for the control shall be set with a relation of t1<t2=t0 and within a range that the PLL lock remains functional in the phase control after an end of the speed control.

In FIG. 1, the crystal oscillator 102 generates a reference clock signal having a specified frequency that is referred in generating a pixel clock signal, and outputs it to the pixel clock generating circuit 103.

Then, the pixel clock generating circuit 103 generates a pixel clock signal for driving the laser light in the exposing unit 1 from the reference clock signal outputted from the crystal oscillator 102 in accordance with a control signal outputted from the controller 101.

The crystal oscillator 104 also generates a reference clock signal having a specified frequency that is referred in generating a polygon mirror driving clock signal, and outputs it to the polygon mirror driving clock generator 105.

Then, the polygon mirror driving clock generator 105 generates a polygon mirror driving clock signal for driving the polygon mirror 113 that emits and scans the laser light on the photosensitive drum from the reference clock signal outputted from the crystal oscillator 104 in accordance with a control signal inputted from the controller 101. The polygon mirror driving clock generator 105 will be described later in detail.

The horizontal synchronizer 106 synchronizes the pixel clock signal generated by the pixel clock generating circuit 103 with the index signal (to be described later) sensed by the index sensor 115, and outputs it to the PWM signal generating circuit 107.

The PWM signal generating circuit 107 generates a PWM signal corresponding to the image data from the image memory 10 in accordance with the pixel clock signal outputted from the horizontal synchronizer 106, and outputs it to the LD drive 108.

The index sensor 115 in the exposing unit 1 senses a main scanning reference signal (index signal) of the laser light emitted from the polygon mirror 113 by an index mirror (not shown), and outputs it to the horizontal synchronizer 106.

The LD drive 108 generates a driving signal for driving the LD 109, a light source to emit light in accordance with the PWM signal outputted from the PWM signal generating circuit 107, and supplies it to the LD 109. Then, the LD 109 emits a laser light in accordance with the driving signal outputted from the LD drive 108.

On the other hand, the polygon mirror motor 112, which is a synchronous motor such as a stepping motor, drives the polygon-mirror 113 to rotate in accordance with the polygon mirror driving clock signal outputted from the polygon mirror driving clock signal generator 105.

Next, the polygon mirror driving clock generator 105 in FIG. 1 is described hereunder. As shown in FIG. 1, the polygon mirror driving clock generator 105 includes a speed controller 105a that controls (speed control) the frequency (speed of the polygon mirror 113) of the signal outputted from a later-explained PLL section by an instruction from the controller 101, a phase controller 105b that controls (phase control) the phase (rotational phase of the polygon mirror 113) of the signal outputted from a later-explained PLL section by an instruction from the controller 101, and a PLL section 105c that generates a signal (polygon mirror driving clock signal) having a specified frequency and predetermined phase by the instructions from the above speed controller 105a and phase controller 105b by using a PLL control.

The PLL section 105c, consisting of a voltage controlled oscillator (herein after VCO), frequency divider, phase comparator, and loop filter, compares the frequency and phase of a signal divided by the frequency divider (not shown) from a reference clock signal of the crystal oscillator 104 with those of a signal divided by the frequency divider (not shown) from an oscillating signal of the VCO, wherein since the dividing ratio for the frequency divider is set by the control of the controller 101, any polygon mirror driving clock signal having a desired frequency and desired phase is generated.

As the dividing ratio for the frequency divider is set from the speed controller 105a by the control of the controller 101, a polygon mirror driving clock signal having a desired frequency is generated.

In addition, as the dividing ratio for the frequency divider is set from the phase controller 105b by the control of the controller 101, a polygon mirror driving clock signal having a desired phase is generated. In this operation, the phase controller 105b controls to obtain a desired phase by reference to the index signal from the index sensor 115.

For the above operation in the back surface image formation in forming an image on both sides, the controller 101 changes the polygon mirror driving clock frequency for each color to adjust the magnification in the paper feed direction in the back surface image formation. For this, the controller 101 changes the setting of the dividing ratio in each frequency divider circuit. In addition, in the back surface image formation in forming an image on both sides, the controller 101 changes the setting of the dividing ratio in each frequency divider circuit also to change and match the phase of the polygon mirror driving clock signal for each color with each other so as to adjust the register shift in the back surface image formation.

Figure 3:
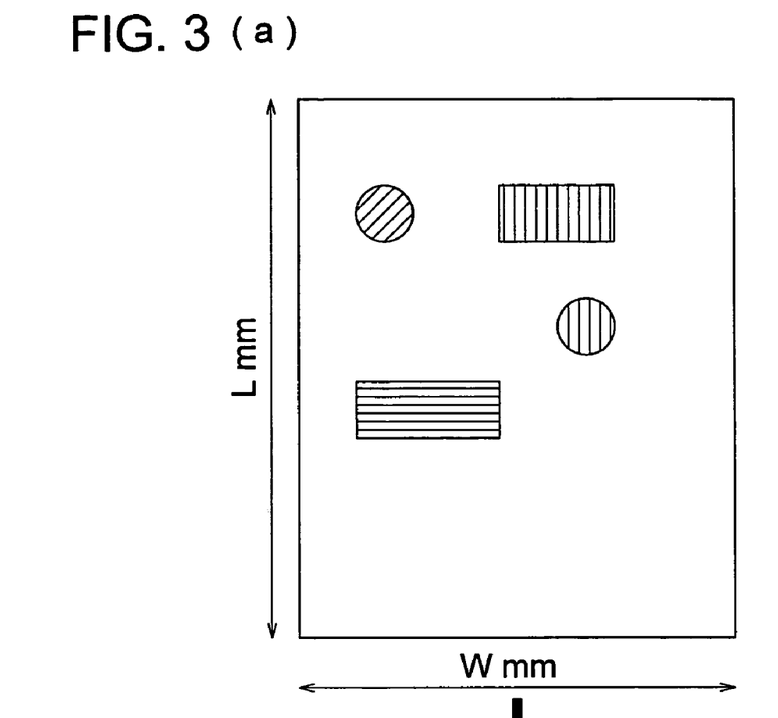
Figure 4:
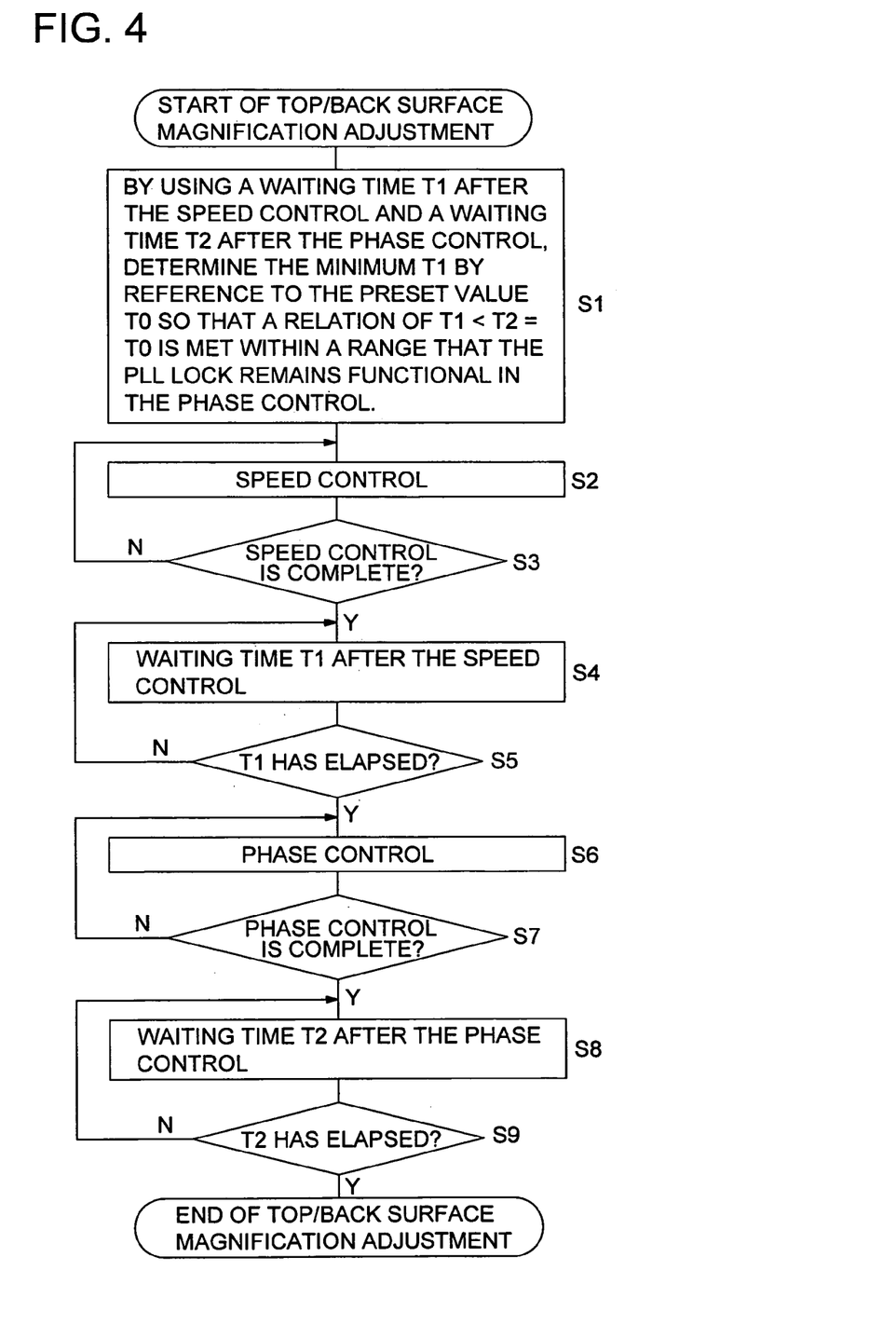
FIG. 4 is a flowchart showing the operation of the image forming apparatus according to an embodiment of the present invention.
Figure 5A:
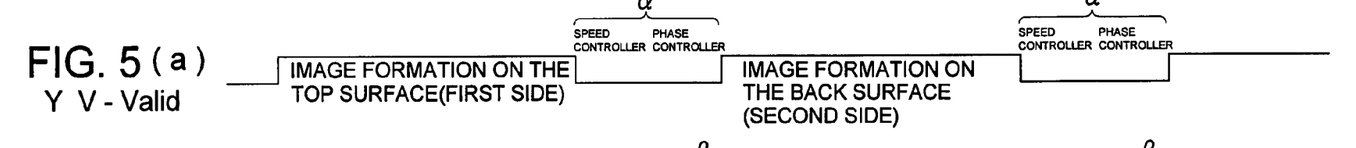
FIG. 5 is a timing chart showing the operation of the image forming apparatus according to an embodiment of the present invention.
Figure 5B:
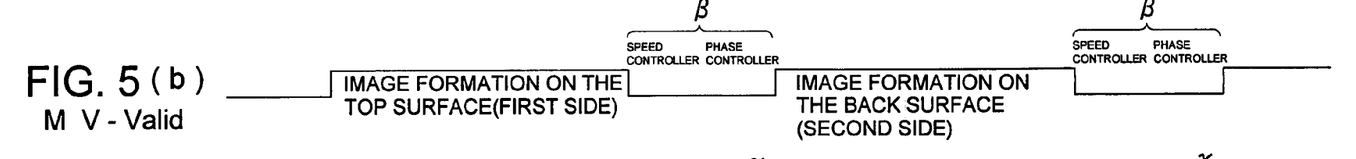
Figure 5C:
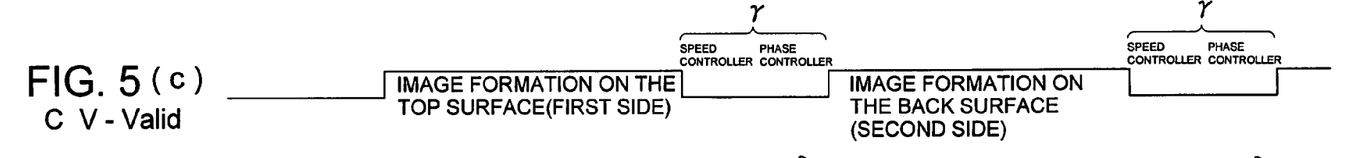
Figure 5D:
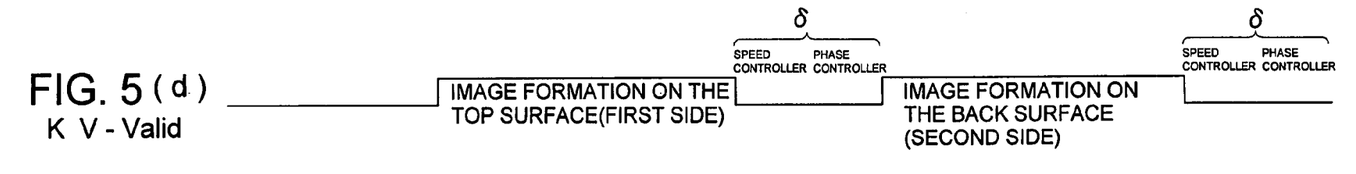

Next, the operation of this embodiment is described hereunder, using the flowchart in FIG. 4. The description below covers the operation in forming an image on both sides to which the polygon mirror driving clock generator 105 shown in FIG. 1 applies. A case where the recording paper P shrinks as shown in FIG. 3 after the fixation on the top surface is described hereunder.

When double-side print of an original document g placed on a document tray of an automatic document feeder 201 is instructed by key operation or touch-panel operation on the image forming apparatus GH, the original document g is conveyed by a conveyance device, the image on both sides of the original document g is scanned and exposed by an optical system of an original image scanning and exposing unit 202, and read by a line image sensor CCD.

The inputted image is photo-electrically converted by the CCD. An analog signal after the photoelectric conversion by the CCD is decomposed into components of each color Y, M, C, K by an image processing unit (not shown), and the components are stored in the image memory 10 as the image data for each color.

In the PWM signal generating circuit 107 (107Y to 107K), a PWM signal for each color, corresponding to the image data for each color stored in the image memory 10, to drive the LD 109 (109Y to 109K) is generated in accordance with the pixel clock signal outputted from the horizontal synchronizer 106 (106Y to 106K).

In the LD drive 108 (108Y to 108K) in the exposing unit 1, a driving signal to have the LD 109 (109Y to 109K) emit a laser light for each color is generated in accordance with the PWM signal for each color generated by the PWM signal generating circuit 107 (107Y to 107K).

The polygon mirror motor 112 (112Y to 112K) drives the polygon mirror 113 (113Y to 113K) to rotate in accordance with the polygon mirror driving clock signal for each color generated by the polygon mirror driving clock signal generator 105 (105Y to 105K) and the laser light driven by the above drive signal is emitted and scanned on the photosensitive drum 2 (2Y to 2K).

Consequently, a static latent image of Y color is formed on the photosensitive drum 2Y by the laser light scanned by the polygon mirror 113Y. The static latent image on the photosensitive drum 2Y is then developed by using Y-color toner supplied from the developing unit 3Y.

A similar process is operated in the exposing units 1M, 1C, 1K and a static latent image of M color, C color, K color is formed on the photosensitive drum 2M, 2C, 2K, respectively. The static latent image on the photosensitive drum 2M, 2C, 2K is then developed by using M-color, C-color, K-color toner supplied from the developing unit 3M, 3C, 3K, respectively.

The Y-color toner image formed by the image forming section 10Y is transferred onto the rotating intermediate transfer belt 20B (primary transfer) and residual toner remained on the circumferential surface of the photosensitive drum 2Y is cleaned by the image forming material cleaning device 4Y, and then the next image forming cycle (back surface image forming cycle) begins.

Next, the M-color toner image formed by the image forming section 10M is transferred onto the rotating intermediate transfer belt 20B to be superposed on the Y-color toner image already transferred. After the transfer of M color is complete, residual toner remained on the circumferential surface of the photosensitive drum 2M is cleaned by the image forming material cleaning device 4M, and then the next image forming cycle (back surface image forming cycle) begins.

Next, the C-color toner image formed by the image forming section 10C is transferred onto the rotating intermediate transfer belt 20B to be superposed on the Y-color and M-color toner image already transferred. After the transfer of C color is complete, residual toner remained on the circumferential surface of the photosensitive drum 2C is cleaned by the image forming material cleaning device 4C, and then the next image forming cycle (back surface image forming cycle) begins.

Next, the K-color toner image formed by the image forming section 10K is transferred onto the rotating intermediate transfer belt 20B to be superposed on the Y-color, M-color and C-color toner image already transferred. After the primary transfer of K color is complete, residual toner remained on the circumferential surface of the photosensitive drum 2K is cleaned by the image forming material cleaning device 4K, and then the next image forming cycle (back surface image forming cycle) begins.

When a completion of the image formation on the top surface (first side) by the image forming section 10Y is judged by the controller 101, the polygon mirror driving clock frequency for Y color used in the image formation on the top surface is multiplied by L/L'. And the product is set as the polygon mirror driving clock frequency for Y color in the image formation on the back surface (second side). And a frequency control signal (speed control signal) is outputted to the polygon mirror driving clock generator 105.

In the polygon mirror driving clock generator 105, a Y-polygon mirror driving clock signal for the image formation on the back surface is generated in accordance with the frequency control signal (speed control signal) outputted from the controller 101 and outputted to the polygon mirror motor 112 in the exposing unit 1Y.

In addition to the change in the setting of the polygon mirror driving clock frequency for Y color, the pixel clock frequency in the image formation on the top surface is multiplied by (L/L')·(W/W'). And the product is set as the pixel clock frequency for Y color in the image formation on the back surface. And a frequency control signal is outputted to the pixel clock frequency generating circuit 103.

In the PWM signal generating circuit 107, a PWM signal corresponding to the Y-color image data for the back surface stored in the image memory is generated in accordance with the pixel clock signal having a changed frequency. In the LD drive 108 in the exposing unit 1Y, a laser light is emitted in accordance with the PWM signal generated by the PWM signal generating circuit 107. The polygon mirror motor 112 rotates the polygon mirror 113 in accordance with the Y-polygon mirror driving clock signal for the image formation on the back surface, and the laser light is scanned on the photosensitive drum 2Y.

Also after the image formation on the top surface by the image forming section 10M, 10C, 10K is complete, the polygon mirror driving clock frequency setting and pixel clock frequency setting are changed for the image formation on the back surface and the same image formation processes as in the image formation section 10Y are begun.

The timing chart of the top/back surface magnification adjustment where the polygon mirror driving clock generator 105 is employed for the image formation on both sides is as shown in FIG. 5. That is, as shown in the timing chart in FIG. 5, the frequency control (speed control) and phase control of the polygon mirror driving clock signal for each color is performed at a timing of α, β, γ, δ, respectively.

To begin with, for various types of recording paper to be set on each tray, the degree of shrinkage, or a shrinkage factor caused by the fixation process in forming an image on both sides under the control by the controller 101 is measured in advance in a specific calibration mode or the like and the result is stored in a data memory (not shown).

The shrinkage factor may differ by a recording condition. To cope with this difference, the shrinkage factor for different paper quality and paper size is measured in advance and stored in the data memory.

In order to change the speed of the polygon mirror 113 along with the image magnification adjustment in adjusting the top/back surface magnification, the controller 101 uses a waiting time t1 from an end of the speed control of the polygon mirror 113 for stabilizing and a waiting time t2 from an end of the phase control of the polygon mirror 113 for stabilizing. And the controller 101 determines t1 by reference to a preset value t0 predetermined for stabilizing after an end of the speed control of the polygon mirror 113 so that a relation of t1<t2=t0 is met within a range that a PLL lock remains functional in the phase control after an end of the speed control (S1 in FIG. 4). Although the speed control and phase control are available even if the PLL lock is out of function, it is desirous to determine t1 within a range that the PLL lock remains functional in the phase control after an end of the speed control. By determining t1 within a range that the PLL lock remains functional, t1 can be made shorter. In addition, it is further more desirous to determine the minimum t1 so that the relation of t1<t2=t0 is met within a range that the PLL lock remains functional.

t1 above can be determined either during the image formation or in advance and stored in a data memory.

At an end of the image formation on the first (top) surface, the controller 101 outputs the above frequency control signal (speed control signal) to the speed controller 105a and the speed controller 105a controls the dividing ratio of the frequency divider in the PLL section 105c so as to generate a polygon mirror driving clock signal having a desired frequency (S2, S3 in FIG. 4). For completing the PLL control in a short time in this operation, it is desirous to control the speed gradually, for example within a rang the PLL lock remains functional, so that the PLL lock should not become out of function in the PLL section 105c. At an end of the speed control by the PLL section 105c, the apparatus is kept waiting by an instruction from the controller 101 for a waiting time t1 before a start of the next phase control (S4, S5 in FIG. 4).

At an end of the image formation on the first surface, the controller 101 outputs the above frequency control signal (speed control signal) to the speed controller 105a and the speed controller 105a controls the dividing ratio of the frequency divider in the PLL section 105c (S2, S3 in FIG. 4) so as to generate a polygon mirror driving clock signal having a desired frequency. At an end of the speed control by the PLL section 105c, the apparatus is kept waiting by an instruction from the controller 101 for a waiting time t1 before a start of the next phase control (S4, S5 in FIG. 4).

After the waiting time t1 has elapsed (Y to S5 in FIG. 4), the controller 101 outputs the above phase control signal to the phase controller 105b and the phase controller 105b controls the dividing ratio of the frequency divider in the PLL section 105c (S6, S7 in FIG. 4) so as to generate a polygon mirror driving clock signal having a desired frequency and desired phase.

For completing the PLL control in a short time in this operation, it is desirous to control the phase gradually, for example within a range that the PLL lock remains functional, so that the PLL lock should not become out of function in the PLL section 105c. At an end of the phase control by the PLL section 105c, the apparatus is kept waiting by an instruction from the controller 101 for a waiting time t2 and after the waiting, the top/back surface magnification adjustment ends (S8, S9 in FIG. 4).

In this embodiment, where a polygon mirror driving clock is generated by using a PLL control to form an image by scanning a light beam on a photosensitive material by the polygon mirror 113 driven by the polygon motor 112, when the speed of the polygon mirror 113 is controlled along with the image magnification adjustment, the speed control is operated before the phase control and, using a waiting time t1 from an end of the speed control of the polygon mirror 113 for stabilizing and a waiting time t2 from an end of the phase control of the polygon mirror 113 for stabilizing, the time t1 is determined by reference to a preset value t0 predetermined for stabilizing after an end of the speed control of the polygon mirror 113 so that a relation of t1<t2=t0 is met within a range that the PLL lock remains functional in the phase control after an end of the speed control.

As a result of the above, the waiting time in controlling the speed of the polygon mirror along with the image magnification adjustment is defined as t1<t2=t0 as compared to a conventional t1=t2=t0. Accordingly, the speed and phase of the polygon mirror can be controlled with a waiting time suitable for stable rotation without lowering the productivity of image formation. A waiting time of total 2t0 was necessary in a prior art but the time can be shortened by t2 t1 in this embodiment. In particular, since this embodiment defines as t0=t2, the time can be shortened by t0−t1 and the productivity can improve accordingly.

In determining t1 as explained above, it is desirous to determine t1 at the beginning of the phase control so that the rotation of the polygon mirror becomes stable to a level enabling to sense the phase shift in the PLL control in the PLL section 105c. This enables to control the speed and phase of the polygon mirror with a waiting time suitable for stable rotation with keeping the image quality.

The above description has referred to the speed and phase control of the polygon mirror in the image formation on the shrunk second surface (back) following the image formation on the first surface (top). In changing the speed to record on the first surface of a next paper following the image formation on the shrunk second surface (back), the speed and phase of the polygon mirror can be controlled in a similar manner by using t1 and t2 of this embodiment.

Figure 6:
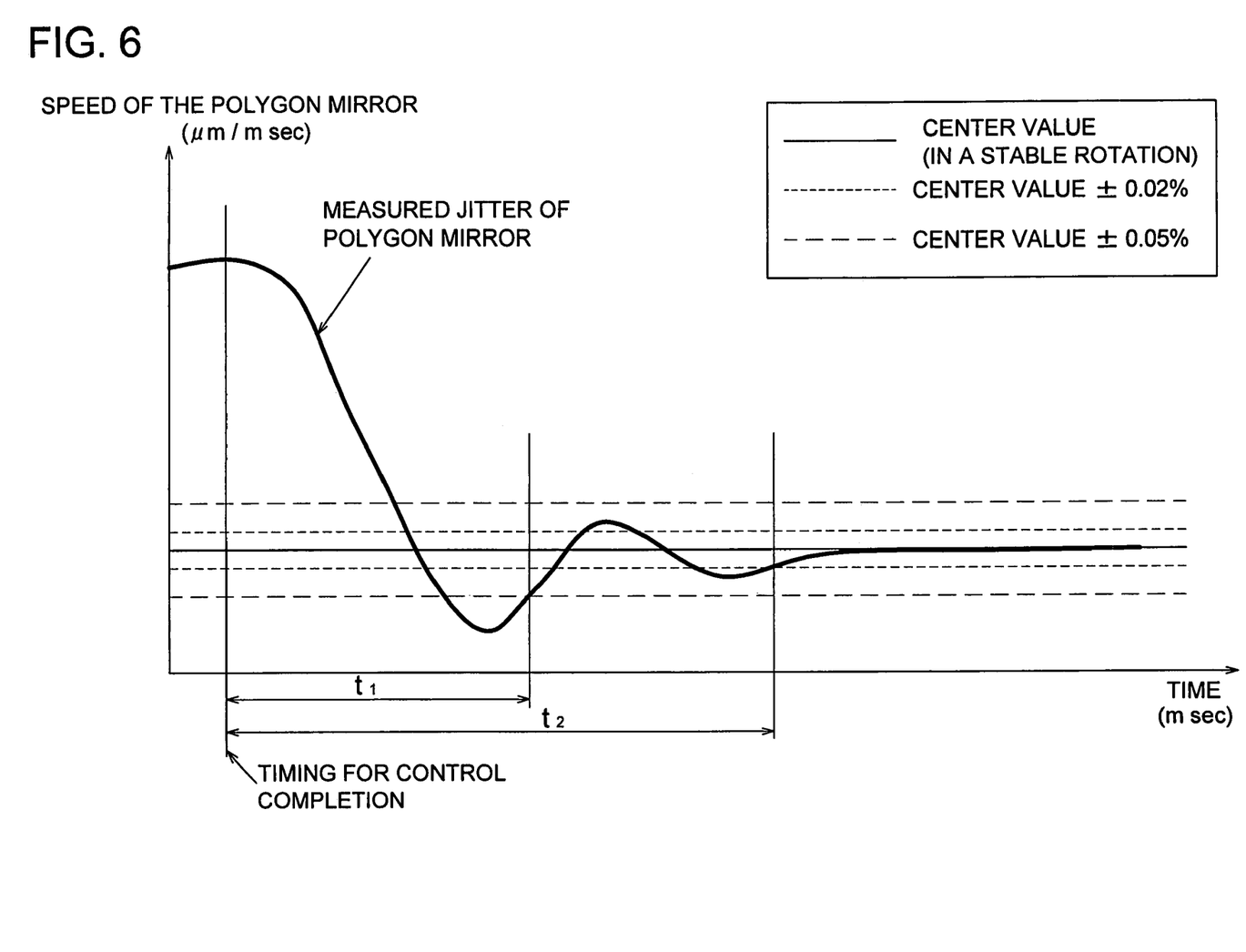
FIG. 6 is a characteristic curve showing the operation of the image forming apparatus according to an embodiment of the present invention.

Next, the curve in FIG. 6 is explained hereunder. The curve shows the change in the speed upon the speed change of the polygon mirror 113. The vertical axis of the curve represents the speed of the polygon mirror 113 and the horizontal axis represents elapsed time. The center value is the speed after the change (target value).

As shown in FIG. 6, if, for example, t0 is determined as a time at which the measured jitter of the polygon mirror 113 becomes ±0.02%, the waiting time t2 is defined as t2=t0 but the waiting time t1 after an end of the speed control can be set as a time at which the phase shift in the PLL control by the PLL section 105c becomes a sensible level, or the measured jitter becomes for example ±0.05% at a start of the phase control.

The above values are just an example and a suitable value shall be selected depending upon a PLL capability, polygon mirror motor 112 or polygon mirror 113 of the PLL section 105c employed. On the image forming apparatus with which the inventor has conducted experiments, t0=t2=300 msec and t1=200 msec were measured. This leads to the reduction of time by 100 msec.

While the description in this embodiment refers to the control by lowering the speed of the polygon mirror 113, the same can apply to the control by increasing the speed.

Another Embodiment (1)

The operation of the above embodiment can apply also to monochrome image formation on both sides but more favorable result can be achieved in case of color image formation on both sides because the resister shift in the back surface image formation can be adjusted. That is to say, in forming a color image on both sides of a recording paper, when the speed of the polygon mirror for each color is controlled along with the image magnification adjustment upon switching from the image formation on one side to the image formation on the other side, the phase is controlled in the polygon mirror drive for each color to match the phase of the polygon mirror for each color after the speed control. Accordingly, the speed and phase of the polygon mirror can be controlled with a waiting time suitable for stable rotation without lowering the productivity of image formation, and not only the image size on the top and back surfaces can be matched but also the color difference on the back surface can be prevented.

Another embodiment (2)

The embodiments above have referred to an electrophotographic image forming apparatus using a laser beam, but the present invention is not limited thereto. Each embodiment of the present invention is applicable to various types of image forming apparatus, such as a laser imager on which laser beam is employed to expose an image on a photosensitive paper, and favorable result can be achieved.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus comprising:
    a polygon mirror for scanning a light beam;
    a clock generating unit to generate polygon mirror driving clock by using a PLL control;
    a polygon mirror driving unit to drive the polygon mirror in accordance with the polygon mirror driving clock;
    a controller to instruct to the clock generating unit for a speed control and a phase control of the polygon mirror and to control the polygon mirror to a target speed with keeping a predetermined phase;
    wherein when the controller controls the speed of the polygon mirror, the controller controls the polygon mirror with a waiting time t1 from an end of the speed control of the polygon mirror for stabilizing before the phase control and a waiting time t2 from an end of the phase control of the polygon for stabilizing, the t1 and t2 being set with a relation of t1<t2.

2. An image forming apparatus according to claim 1, which comprises a photosensitive member and the light beam scans the photosensitive member.

3. An image forming apparatus according to claim 1, wherein the speed of the polygon mirror is controlled upon image magnification adjustment.

4. An image forming apparatus according to claim 1, wherein the controller controls the polygon mirror with t1 and t2, t1 and t2 being set with a relation of t1<t2=t0, based on a preset value t0 predetermined for stabilizing after an end of the speed control of the polygon mirror.

5. An image forming apparatus according to claim 1, wherein the controller determines t1 and t2 within a range that a PLL lock remains functional in the phase control after an end of the speed control.

6. An image forming apparatus according to claim 1, wherein the controller determines t1 so that at the beginning of the phase control the rotation of the polygon mirror becomes stable to a level enabling to sense the phase shift in the PLL control.

7. An image forming apparatus according to claim 1, which is provided with a function of forming an image on both sides of a recording paper, wherein the controller controls the speed of the polygon mirror upon switching from the light beam scanning for image formation on one side to the light beam scanning for image formation on the other side.

8. An image forming apparatus according to claim 7, wherein the speed is controlled so as to adjust the image magnification of the images to be formed on one side and the other side.

9. An image forming apparatus according to claim 7, wherein the image magnification is adjusted in accordance with the shrinkage factor of a recording paper on one side of which an image has recorded.

10. An image forming apparatus according to claim 1, which is provided with a function of forming a color image on both sides of a recording paper, comprising:
    a clock generating unit for each color to generate a polygon mirror driving clock for each color by using a PLL control; and
    a polygon mirror driving unit for each color to drive the polygon mirror for each color in accordance with the polygon mirror driving clock;
    wherein when the controller controls the speed of the polygon mirror for each color along with the image magnification adjustment upon switching from the image formation on one side to the image formation on the other side, the controller determines t1 and controls the phase to match the phase of the polygon mirror for each color after the speed control.

11. An image forming apparatus provided with a function of forming an image on both sides of a recording paper, comprising:
    a polygon mirror for scanning a light beam;
    a clock generating unit to generate a polygon mirror driving clock by using a PLL control;
    a polygon mirror driving unit to drive the polygon mirror in accordance with the polygon mirror driving clock;
    a controller to instruct to the clock generating unit for a speed control and a phase control of the polygon mirror and to control the polygon mirror to a target speed with keeping a predetermined phase;
    wherein when the controller controls the speed of the polygon mirror upon switching from the light beam scanning for image formation on one side to the light beam scanning for image formation on the other side, the controller controls the polygon mirror with a waiting time t1 from an end of the speed control of the polygon mirror for stabilizing before the phase control and a waiting time t2 from an end of the phase control of the polygon mirror for stabilizing, the t1 and t2 being set with a relation of t1<t2.

12. An image forming apparatus according to claim 11, which comprises a photosensitive member and the light beam scans the photosensitive member.

13. An image forming apparatus according to claim 11, wherein the speed of the polygon mirror is controlled upon image magnification adjustment.

14. An image forming apparatus according to claim 11, wherein the controller controls the polygon mirror with t1 and t2, t1 and t2 being set with a relation of t1<t2=t0, based on a preset value t0 predetermined for stabilizing after an end of the speed control of the polygon mirror.

* * * * *